Patented Mar. 18, 1941

2,235,625

UNITED STATES PATENT OFFICE 2,235,625

SOFTENER FOR POLYMERIZED MATERIALS

William D. Wolfe, Cuyahoga Falls, Ohio, assignor to Wingfoot Corporation, Wilmington, Del., a corporation of Delaware No Drawing. Application June 29, 1938, Serial No. 216,588

8 Claims. (Cl. 260—84)

This invention relates to rubber-like polymers having improved properties and, more particularly, to rubber-like resins containing a softening agent.

Butadiene, copolymerized with another polymerizable material yields resinous masses which have been proposed as substitutes for rubber and for other uses where the properties of such copolymers are desired in a plastic mass. However, the copolymers obtainable from a butadiene compound and an unsaturated compound copolymerizable therewith are often hard and unworkable. In accordance with the practice of the present invention, it has been found that copolymers of a butadiene compound and a vinyl compound can be prepared in softer form in a controlled manner by the inclusion in the monomers before polymerization of a small amount of a diazo amino aryl compound. The polymerization then proceeds in the usual manner but the result is a mass which is much softer than is obtainable when the diazo amino aryl compound is not present. An example of such a compound is diazo amino benzene

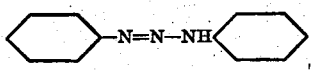

Other diazo amino aryl compounds may also be used, such as ortho, meta, and para diazo amino toluenes, the diazo amino xylenes, toluene azo benzyl amine,

4-methyl diazo amino benzene,

ortho and para benzene azo tolu benzyl amine, 5-diazo amino pseudo cumene, para toluene azo s-pseudo cumidine, benzene azo para cuminyl amine, benzene azo tetrahydro naphthylamine, and alpha and beta diazo amino naphthalenes.

The amount of the diazo amino aryl compound which is added may vary from ⅓ of 1% to 1¼% of the total monomer present, this being the most useful range but, of course, some variation outside this range is also permissible. A gradually increasing softness and tackiness of a given copolymer will be noted as the amount of diazo amino aryl compound is increased. Sufficient tackiness is ordinarily observable when 1¼% of a diazo amino aryl compound is added and, therefore, more than this is not ordinarily desirable. On the other hand, less than ⅓ of 1% will ordinarily not produce sufficient tackiness.

The softening effect of the diazo amino aryl compound is exerted during the polymerization and it is, consequently, added before such polymerization ensues. It may be used with copolymers prepared from any butadiene compound, such as butadiene itself, methyl butadiene or isoprene, dimethyl butadiene, etc. and a monomer which may be a ring-substituted vinyl compound or an acrylo nitrile, styrene, vinyl naphthalene and vinyl furane being examples of the former and acrylo nitrile and methacrylonitrile being examples of the latter. Other suitable monomers are the esters of acrylic acid, such as methyl acrylate, ethyl acrylate, isobutyl acrylate, isoamyl acrylate and esters of substituted acrylic acids, such as methyl methacrylate, ethyl methacrylate, 2-ethyl hexyl methacrylate and isoamyl ethacrylate.

As an example of one method by which the invention can be carried out, the following is given, although it will be obvious that the utility of the invention is not limited thereto. When 75 parts of butadiene and 25 parts of styrene are copolymerized by agitation at 50° C. in sodium oleate emulsion in the presence of such catalysts as NaBO₃ and CCl₄, the resulting product is usually a dry or non-tacky rubbery solid which is hard to work on the mill. If, however, small amounts of diazo amino benzene are put into the emulsion the resulting products are very much softer, depending upon the proportion of the diazo amino benzene compound which is present. By gradations of the proportion of diazo amino benzene with respect to the amount of polymerizable monomers, products are obtained which vary in consistency from that of the control, containing no softening agent, to a tarry mass.

Thus, butadiene and styrene in the proportion of 75 parts and 25 parts, respectively, by weight, were mixed and sealed in glass tubes which contained the usual emulsifying solution, 3% sodium oleate, 0.83 part of NaBO₃ and 3.0 parts of CCl₄.

Diazo amino benzene was then added to the various tubes in the proportions shown below. After polymerization at 50° C. for 88 hours, the products were isolated and dried. The nature of the products is shown below:

| $C_6H_5N=NNHC_6H_5$ Percent of monomers | Character of product |
|---|---|
| 1.25 | Soft tacky solid. |
| 0.65 | Soft tacky solid; tougher than above. |
| 0.32 | Soft pliable solid; slightly tacky. |
| None | Med. soft pliable solid; non-tacky. |

It will be noted that the product varied from a soft tacky solid when 1¼% of diazo amino benzene was present to a non-tacky solid when none of the softening agent was present. It will be understood that the percentage of softening agent is based on the total monomer present, i. e., the butadiene+the styrene.

The foregoing series was repeated, but the monomers were polymerized at room temperature, 22-26° C., instead of 50° C., and the products obtained were even softer than in the first series, with the exception of the control, which, again, was firm and dry. The conditions under which polymerization is conducted may thus be varied as to temperature and time and may also be varied as to the emulsifying agents, catalysts and oxidizing agents used.

Similar effects may be secured by the use of any one of the diazo amino aryl compounds mentioned above or others belonging to the same class.

While there have been described above certain preferred embodiments of the invention, the same is not limited thereto but only by the appended claims wherein it is intended to set forth all features of patentable novelty residing in the invention.

What I claim is:

1. A method of improving the properties of resins prepared by treating a mixture of a butadiene compound and a monomer selected from the group consisting of ring substituted vinyl compounds, acrylo nitriles and esters of acrylic acids, which comprises adding a diazo amino aryl compound to the monomeric mixture before polymerization.

2. A method of improving the properties of resins prepared by treating a mixture of butadiene and a monomer selected from the group consisting of ring-substituted vinyl compounds, acrylo nitriles and esters of acrylic acids which comprises adding a diazo amino phenyl compound to the monomeric mixture before polymerization.

3. A method of improving the properties of resins prepared by copolymerizing a mixture of a butadiene compound and a monomer selected from the group consisting of ring-substituted vinyl compounds, acrylo nitriles and esters of acrylic acids which comprises adding from 0.25 to 1.25% of the total weight of the monomers of a diazo amino aryl compound to the mixture and then polymerizing.

4. A method of improving the properties of resins prepared by treating a mixture of a butadiene compound and a monomer selected from the group consisting of ring-substituted vinyl compounds, acrylo nitriles and esters of acrylic acids which comprises adding diazo amino benzene to the monomeric mixture before polymerization.

5. A method of improving the properties of resins prepared by treating a mixture of butadiene and acrylo nitrile which comprises adding diazo amino benzene to the mixture of monomers and then polymerizing.

6. A method of improving the properties of resins prepared by treating a mixture of a butadiene compound and acrylo nitrile which comprises adding from ⅓ to 1¼% on the total monomer of diazo amino benzene to the mixture and then polymerizing.

7. A method of improving the properties of resins prepared by treating a mixture of butadiene and acrylo nitrile which comprises adding from ⅓ to 1¼% on the total monomer of diazo amino benzene to the mixture and then polymerizing.

8. A method of improving the properties of resins prepared by treating a mixture of butadiene and styrene which comprises adding from ⅓ to 1¼% on the total monomer of diazo amino benzene to the mixture and then polymerizing.

WILLIAM D. WOLFE.